March 9, 1954  M. F. MURRAY ET AL  2,671,831
SAFETY SWITCH FOR THE ELECTRICAL CIRCUITS OF VEHICLES
Filed Feb. 12, 1952

Michael F. Murray
Frank J. Berger
INVENTORS.

BY *Clarence A.O'Brien*
*and Harvey B. Jacobson*
Attorneys

Patented Mar. 9, 1954

2,671,831

UNITED STATES PATENT OFFICE 2,671,831

SAFETY SWITCH FOR THE ELECTRICAL CIRCUITS OF VEHICLES

Michael F. Murray and Frank J. Berger, Eugene, Oreg., assignors of thirty per cent to George W. Pierce, Eugene, Oreg.

Application February 12, 1952, Serial No. 271,092

5 Claims. (Cl. 200—61.47)

This invention relates to new and useful improvements in safety devices for vehicles and the primary object of the present invention is to provide a switch operatively connected to the circuit of a vehicle and which will be actuated to a circuit open position in the event of an accident in order to prevent fires resulting from gasoline coming in contact with bared live wires.

Another important object of the present invention is to provide a safety switch for the electrical circuit of a vehicle that is quickly and readily operatively connected to the circuit in a convenient manner and which switch is extremely small and compact in structure to occupy very little space.

A further object of the present invention is to provide a shock responsive mercury switch of two particular forms one of which is adapted to be mounted within the motor compartment of a vehicle above the battery and the other of which is adapted for attachment to the terminals of a battery to be supported thereby.

A still further aim of the present invention is to provide a safety switch of the aforementioned character that is simple and practical in construction, strong and reliable in use, efficient and durable in operation, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
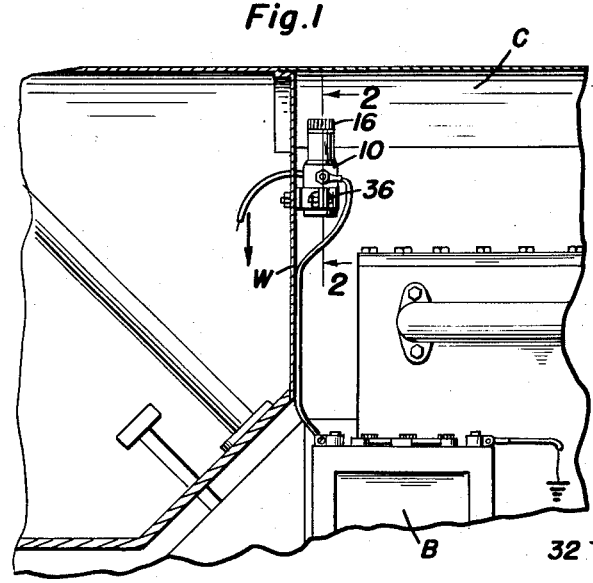
Figure 1 is a fragmentary view of a vehicle and showing the present invention connected to the electrical circuit of the vehicle.
Figure 2:
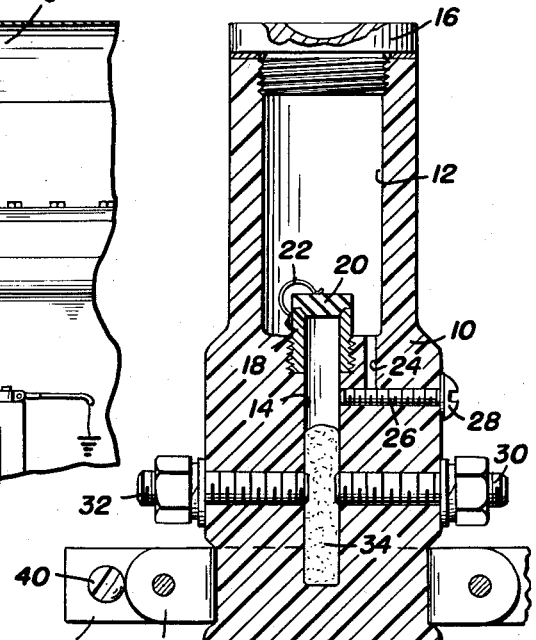
Figure 2 is an enlarged vertical sectional view taken substantially on the plane of section line 2—2 of Figure 1.

Referring now to the drawings in detail, wherein for the purpose of illustration, there is disclosed a preferred embodiment of the present invention, the numeral 10 represents a non-conductive body, preferably of plastic material, having an upper chamber 12 and a lower chamber 14. A closure and sealing plug 16 is threadingly received in the upper open end of the upper chamber 12.

The upper end of the chamber 14 is internally threaded to receivably engage a valve seat or sleeve 18 that extends upwardly into the chamber 12. A resilient valve 20 is normally seated against the seat 18 and is urged thereagainst by a U-spring 22 having one end secured to the seat 18 and its other end resting against the valve.

Body 10 is formed with a substantially L-shaped by-pass passage 24 that extends from the lower end of the chamber 12 to the upper end of the chamber 14 and which by-passes the valve 20. A threaded bore 26 in the lower end of the body 10 extends through the horizontal part of the passage 24 and receivably engages a threaded stud or valve member 28 that normally closes the passage 24.

A pair of conductors or contacts 30 and 32 are carried by the lower portion of body 10 and extend into the chamber in spaced relationship. The space between the conductors 30 and 32 is closed by mercury or a like conductive liquid 34.

A clamp bracket 36 embraces the lower portion of the body and includes a pair of ears 38 that receive fasteners 40, whereby the device may be secured to a wall W of a motor compartment C.

The conductor 30 is connected to the battery B and the conductor 32 is connected to the circuit of the vehicle. Should the vehicle become involved in an accident or overturn, the mercury 34 will rise in chamber 14, engage and open the valve 20 and pass into the chamber 12. Insufficient mercury will be present in the chamber 14 to bridge the gap between the conductors 30, 32, therefore, the circuit will be open until the stud 28 is backed up to permit the mercury to by-pass the valve 20 and return to chamber 14.

Figure 3:
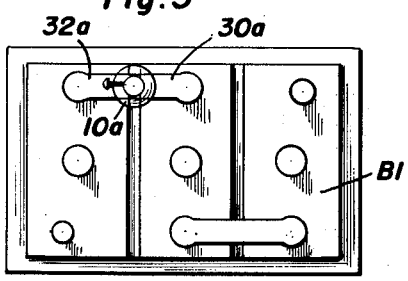
Figure 3 is a plan view of a vehicle battery and showing the invention in modified form applied thereto.
Figure 4:
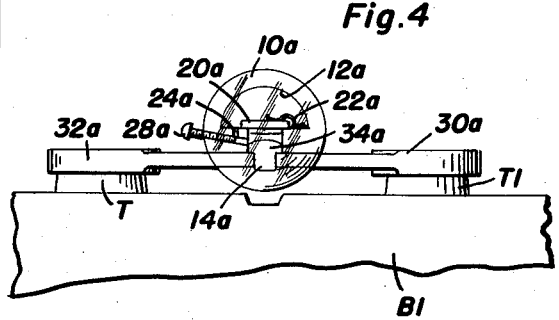
Figure 4 is an enlarged fragmentary side view of Figure 3.
Figure 5:
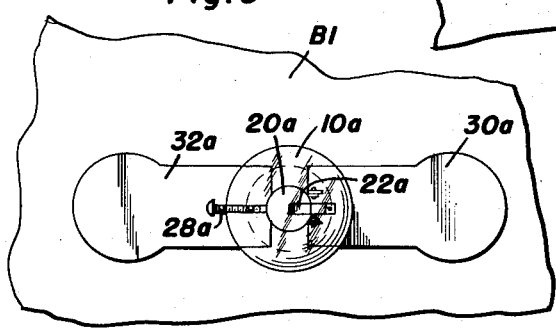
Figure 5 is an enlarged fragmentary view of Figure 3.

Figures 3, 4 and 5 show the invention in modified form to be attached to two terminals T and T1 of a battery B1. In this embodiment, the body 10a is transparent and includes upper and lower chambers 12a and 14a.

A valve seat at the adjacent ends of the chambers receives a valve 20a that is urged against the seat by a spring 22a. A by-pass passage 24a in the body 10a by-passes the valve 20a and receivably engages a valve member 28a.

The conductors 30a and 32a extend from the chamber 14a and are provided with socketed or recessed ends accommodating the terminals T and T1.

Mercury 34a is placed in the lower chamber to bridge the gap between the conductors 30a and 32a until the vehicle is jarred, whereupon the mercury will open the valve and pass into the upper chamber, after which the valve will be closed. This results in opening the battery circuit until the valve member 28a is backed up to permit the mercury to return to the chamber 14a.

Having described the invention, what is claimed as new is:

1. A safety switch for the electrical circuit of a vehicle, said switch comprising a body member having upper and lower aligned communicating chambers, a valve seat at the upper end of the lower chamber and extending upwardly into the upper chamber and being concentric with the upper chamber, a valve normally positioned on the seat, a pair of contacts carried by the lower end of the body member and extending into the lower chamber, and a conductive liquid in the lower chamber bridging the contacts until the body member is jarred, whereupon the liquid will open the valve and pass into the upper compartment, and a by-pass passage from the upper compartment into the lower compartment and by-passing the valve, and a valve member closing the passage.

2. The combination of claim 1 wherein said valve member comprises a threaded stud entering the passage, said stud being backed up from the passage to permit liquid in the upper compartment to pass into the lower compartment through the passage.

3. In a vehicle having an electrical circuit, a mercury switch operatively positioned in the circuit and comprising a pair of conductors, a chamber into which the conductors extend, mercury in the chamber bridging the conductors, and valve means for the chamber and being opened by the mercury to permit the escape of mercury from the chamber to open the circuit in response to jarring of the switch as a result of an accident, said conductors comprising a pair of arms having recesses therein for receiving battery terminals.

4. A safety switch for the electrical circuit of a vehicle, said switch comprising an elongated body member having upper and lower end portions, said upper end portion of said body member having a cylindrical longitudinal recess therein, said lower end portion of said body member having an axial blind bore extending downwardly from and communicating with the lower end of the recess, the upper end of said bore having an enlarged entrance, a seat-forming sleeve having a lower end secured in said entrance and an upper end extending upwardly into the recess, a flap valve carried by the upper end of the sleeve and closing the latter, said body member having a passage in its lower end portion extending from the recess to the bore and by-passing the valve, a valve member carried by the body member closing the passage and being moved in the passage to permit a conductive liquid in the recess to pass into the bore, a pair of electrical contacts carried by the body member and extending into the bore in spaced relationship, and a conductive liquid in the bore bridging the contacts until the body member is jarred, whereupon the liquid will open the valve and pass into the recess.

5. The combination of claim 4 and a U-shaped spring member terminally secured to the valve and the upper end of said sleeve and yieldingly urging the valve against the upper end of said sleeve.

MICHAEL F. MURRAY.
FRANK J. BERGER.

References Cited in the file of this patent

UNITED STATES PATENTS

| Number | Name | Date |
| --- | --- | --- |
| 1,858,191 | Hadley | May 10, 1932 |
| 2,119,944 | Mattern | June 7, 1938 |

FOREIGN PATENTS

| Number | Country | Date |
| --- | --- | --- |
| 387,509 | Great Britain | Feb. 9, 1933 |